INVENTOR.
JOHANNES C. VERMEULEN
BY Fraser and Bogucki
ATTORNEYS

FIG. 2A IDEAL DATA SIGNAL, FIG. 2B PULSES FROM PEAK PULSER 14, FIG. 2C SAWTOOTH WAVEFORM FROM GENERATOR 40, FIG. 2D REFERENCE CLOCK FROM TRIGGER 50, FIG. 2E DETECTED ONE'S OUTPUT, FIG. 2F PEAK SHIFTED DATA SIGNAL, FIG. 2G PULSES FROM PEAK PULSER 14, FIG. 2H DETECTED ONE'S OUTPUT, FIG. 2I IDEAL DATA SIGNAL, FIG. 2J PULSES FROM PEAK PULSER 14, FIG. 2K DETECTED ONE'S OUTPUT, FIG. 2L PEAK SHIFTED DATA SIGNAL, FIG. 2M PULSES FROM PEAK PULSER 14, FIG. 2N DETECTED ONE'S OUTPUT

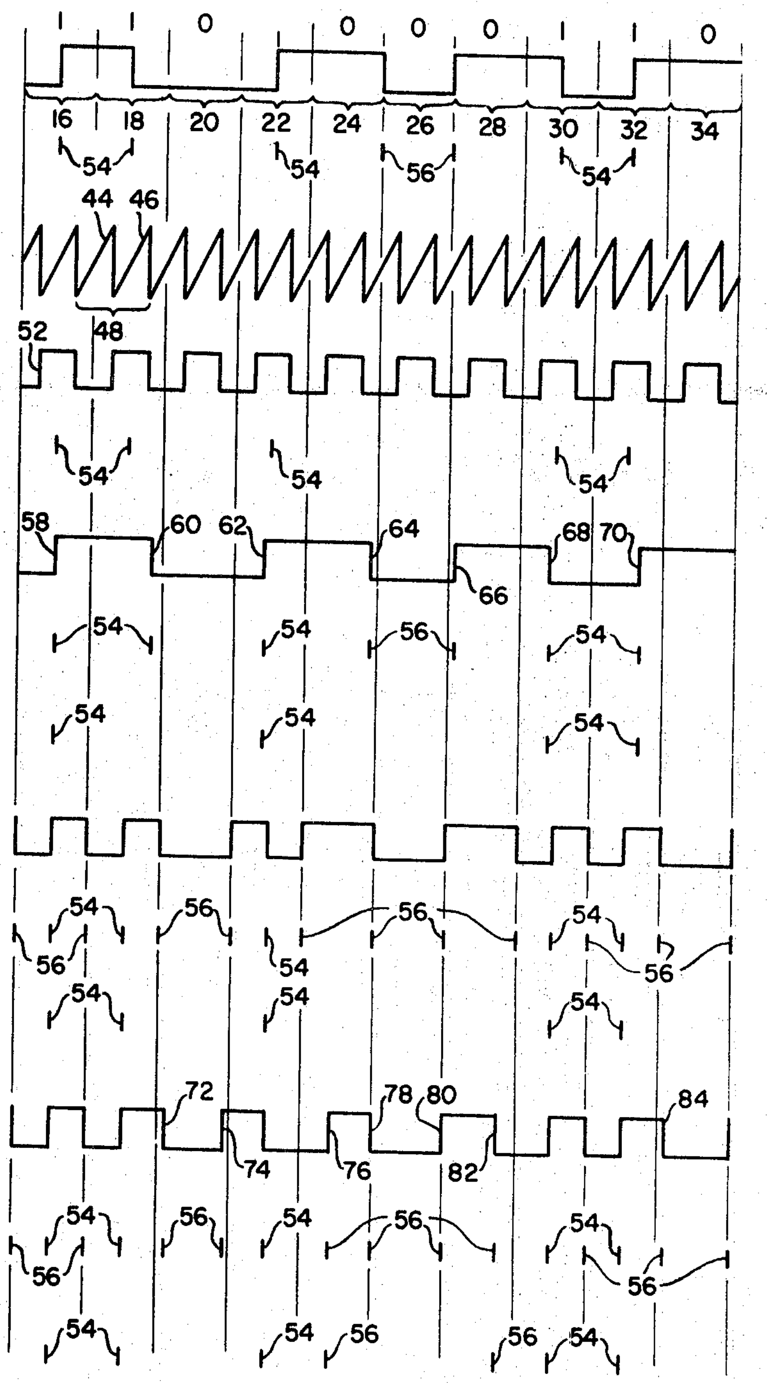

INVENTOR.
JOHANNES C. VERMEULEN
BY [signature]
ATTORNEYS

FIG. 4A PEAK SHIFTED DATA SIGNAL, FIG. 4B PULSES FROM PEAK PULSER 14, FIG. 4C SAWTOOTH WAVEFORM FROM GENERATOR 40, FIG. 4D REFERENCE CLOCK FROM TRIGGER 50, FIG. 4E OUTPUT OF VOLTAGE DISCRIMINATOR 100, FIG. 4F OUTPUT OF OR CIRCUIT 106, FIG. 4G OUTPUT OF EXCLUSIVE OR CIRCUIT 110, FIG. 4H DETECTED ONE'S OUTPUT

INVENTOR.
JOHANNES C. VERMEULEN
BY Fraser and Bogucki
ATTORNEYS

INVENTOR.
JOHANNES C. VERMEULEN
BY Fraser and Bogucki
ATTORNEYS

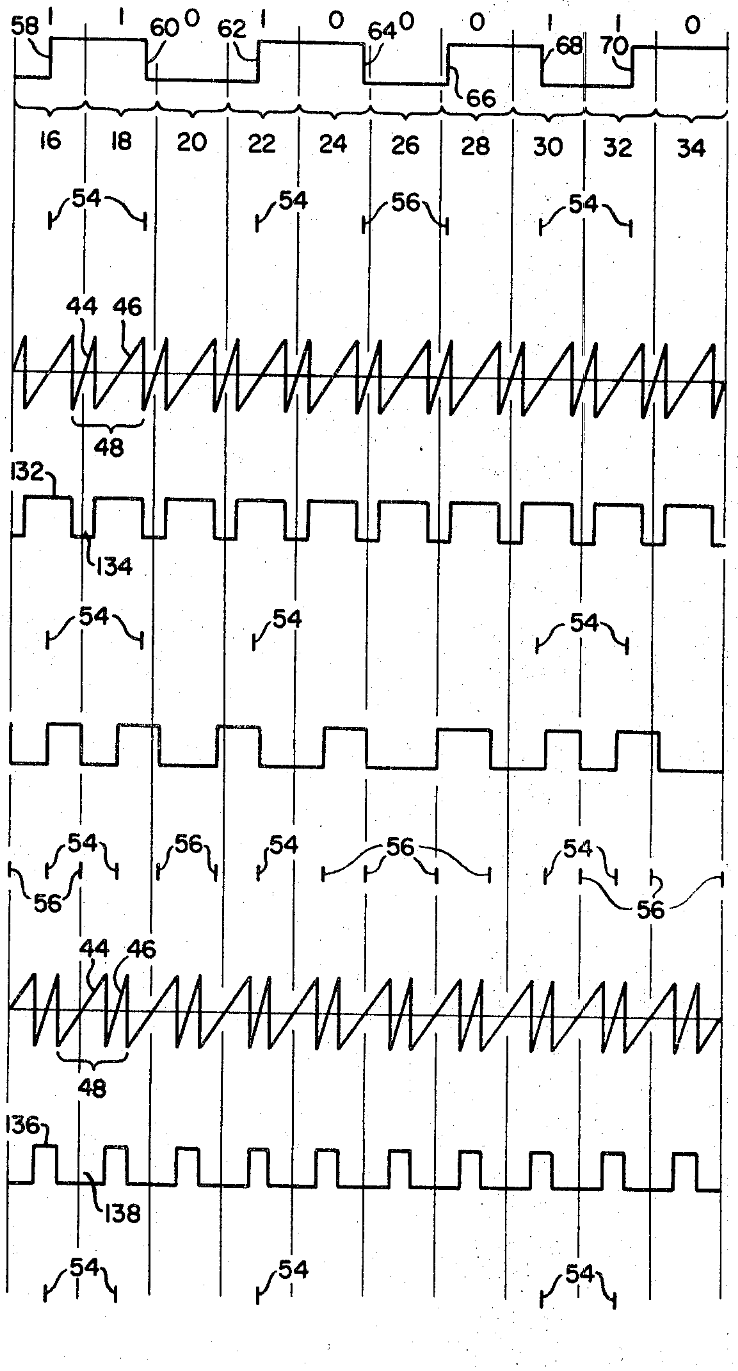

FIG. 6A PEAK SHIFTED DATA SIGNAL, FIG. 6B PULSES FROM PEAK PULSER 14, FIG. 6C SAWTOOTH WAVEFORM FROM GENERATOR 40, FIG. 6D REFERENCE CLOCK FROM TRIGGER 50, FIG. 6E DETECTED ONE'S OUTPUT, FIG. 6F PEAK SHIFTED DATA SIGNAL, FIG. 6G PULSES FROM PEAK PULSER 14, FIG. 6H SAWTOOTH WAVEFORM FROM GENERATOR 40, FIG. 6I REFERENCE CLOCK FROM TRIGGER 50, FIG. 6J DETECTED ONE'S OUTPUT

INVENTOR.
JOHANNES C. VERMEULEN
BY Fraser and Bogucki
ATTORNEYS

INVENTOR.
JOHANNES C. VERMEULEN
BY Fraser and Bogucki
ATTORNEYS

United States Patent Office
3,532,999
Patented Oct. 6, 1970

3,532,999
REFERENCE CLOCK GENERATOR HAVING UNEQUAL ADJACENT PERIOD INTERVALS

Johannes C. Vermeulen, Boulder, Colo., assignor to International Business Machines Corporation, Armonk, N.Y., a corporation of New York Filed Jan. 14, 1969, Ser. No. 790,910
Int. Cl. H03d 3/18
U.S. Cl. 329—50 11 Claims

ABSTRACT OF THE DISCLOSURE

A data detection system is provided in which the processing of raw data pulses is controlled by a sawtooth generator having successive pairs of cyclic variations of different duration. The sawtooth generator responds to the processing signal at the output of an associated trigger via a feedback loop to provide asymmetrical clock pulse ratios such as 60/40 or 40/60 during each bit interval. The feedback loop responds to the transitions in the processing signal at the trigger output to alternatively apply one or the other of two currents of different value to charge a capacitor within the sawtooth generator at rates determined by the values of the applied currents.

BACKGROUND OF THE INVENTION

Field of the invention

The present invention relates to data detection systems, and more particularly to systems in which raw data pulses are processed using a sawtooth generator, the frequency of which is controlled by the data rate.

Description of the prior art

A variety of techniques are available for detecting data which is in digitally encoded form. The particular technique used depends on a number of factors including the type of encoding employed. NRZI and double frequency (frequency modulation) encoding, for example, denote data by the presence or absence of a transition of the data signal at the center of each bit cell.

One technique commonly employed to detect data makes use of a variable frequency oscillator to generate a reference clock in phase-locked relation with the incoming data pulses. The reference clock which may be of sawtooth waveform is applied to a binary trigger to alternately open and close an associated data pulse gate during different portions of each bit cell interval. Data pulses at the centers of the bit intervals are gated to an output as "one's" while "zero" or clock pulses at the edges of the bit intervals are blocked. The successive cyclic variations of the sawtooth waveform which are of equal duration provide a 50/50 gate/nongate ratio, the data gate being opened during the center half of each bit cell interval and being closed during the first quarter and the last quarter of the interval.

The increasing sophistication of modern data processing and other related systems has dictated increased density in the recording, transmitting or other processing of the data. The advantages attendant in increased data density, however, are frequently offset by the problems involved in detecting the data. Thus where adjacent magnetic transitions on a recording medium have variable time spacings therebetween, the read head may effectively displace the transitions in time during sensing of the magnetic recording. This phenomenon, termed bit shift or peak shift, often leads to errors in the detection of the data. In detection arrangements employing a symmetrical or 50/50 gate/nongate ratio, for example, data or "one" pulses shifted in either direction by more than 25% of the bit interval are not gated to the output. Similarly, "zero" or clock pulses shifted more than 25% of the bit interval are erroneously gated to the output as a "one." Such peak shifted pulses, moreover, frequently lead to errors in the phase of the reference clock itself. Data and clock pulses which do not coincide with zero-crossings of the sawtooth waveform result in the generation of correction signals of either polarity depending upon the direction of bit shift. Thus, early data pulses may be read as late clock pulses which will further decrease the frequency of the sawtooth waveform when instead it should be increased. One or more of such pulses may cause complete loss of synchronization.

The degree of bit shift is normally dependent on the frequency or time interval length between the various magnetic transitions. In certain types of encoding such as that of the double frequency type, the transitions at the opposite edges of a bit cell representing a "zero" undergo the greatest shift while the transitions at the center of those bit cells representing a "one" undergo little if any shift. Accordingly, data encoded in this fashion is ideally detected by an arrangement in which the gating interval is shorter than the nongating interval by a ratio such as 45/55 or 40/60. Other types of encoding may be accompanied by considerable bit shift of those transitions at the centers of bit cells denoting a "one" and by little if any shift of the transitions at the edges of bit cells denoting a "zero." One type of data encoding which undergoes this type of peak shift is disclosed in a copending application, Ser. No. 653,784, filed July 17, 1967, and commonly assigned with the present application. The encoding technique which is disclosed in such application and which is termed modified frequency encoding involves the writing of a transition at the center of each bit cell which is to represent a "one." Clock transitions are written at the leading edge of each bit cell which is to represent a "zero" except where the particular cell in question is immediately preceded by a cell in which a "one" is written. The relatively long time intervals between some of the "one" transitions and the relatively short time intervals adjacent many of the "zero" transitions cause a greater peak shift among the "one" transitions than among the "zero" transitions. In systems for detecting data encoded in this fashion, the gating interval is desirably of greater duration than the nongate interval to allow for the greater shift of the "one" transitions relative to the centers of the bit cells. In such situations, a gate/nongate ratio of 55/45 or even 60/40 may be desirable.

One conventional arrangement for increasing the gating interval relative to the nongating interval employs a voltage discriminator in combination with the sawtooth generator. The voltage discriminator responds to positive and negative values of the sawtooth waveform above a predetermined threshold level to generate signals which are combined with the gating signal at the output of a binary trigger to extend the opposite edges of the gating pulses. Such an arrangement improves the gate/nongate ratio without making any change in the basic reference clock. The sawtooth generator is therefore subject to a complete loss of synchronization unless separate circuitry is added to inhibit those data pulses shifted more than 25% of the bit interval. Inhibit techniques do not entirely solve the synchronization problem, however, since they reduce the time interval during which the clock pulses may be accepted to update the sawtooth generator. More importantly, however, gate/nongate ratios such as 55/45 which are not far removed from the basic 50/50 ratio provided by the sawtooth generator and trigger are difficult or impossible to achieve due to constant variations in the peak amplitudes of the sawtooth waveform and to drifts in the threshold. The 50/50 ratio itself is moreover difficult or impossible to achieve due to flyback times of the sawtooth waveform which are finite and may comprise 2% or more of the bit interval length.

SUMMARY OF THE INVENTION

Data detection systems in accordance with the invention generate a reference clock of sawtooth or other appropriate waveform in which successive pairs of the cyclic variations thereof have different period intervals. The need for separate inhibit circuitry to prevent widely shifted pulses from causing a loss of synchronization is eliminated. The synchronization is itself improved by the decreased slope of alternate cyclic variations of the sawtooth waveform, the tendency to overcompensate the sawtooth frequency in response to widely shifted pulses being negated by the relatively small correction signals which result therefrom. Undesirable threshold sensing of the sawtooth waveform is moreover eliminated by systems in accordance with the invention. Instead, the complete processing signal is generated in response to more reliable flyback portions of the sawtooth waveform.

In one preferred arrangement of a detection system in accordance with the invention, the incoming data pulses are used to generate a sawtooth waveform having twice the frequency of the data rate. The time duration of successive pairs of the cyclic sawtooth variations is therefore equal to the bit time intervals of the data signal, and the zero-crossings thereof are held in coincidence with the various data and clock pulses. The cyclic sawtooth variations within each pair, however, have unequal period intervals, the cyclic variation which occurs at the center of each bit cell interval being shortened or lengthend relative to the adjacent cyclic variations as desired. A binary trigger responds to the flyback portion of the first cyclic variation within each pair to commence the generation of a processing pulse. Each processing pulse is terminated by the flyback portion of the second cyclic variation within each pair. In a detection system which uses gating pulses to detect and identify raw data pulses, these processing pulses may be used as a data gate, a data pulse gate responding to each processing pulse to gate data pulses to an output. Processing pulses generated in accordance with the invention are useful in other types of detection systems as well as those of the pulse gating type, however, because of their ability to prevent loss of synchronization of the sawtooth waveform due to widely shifted data or clock pulses and their tendency to minimize the generation of excessively large synchronization correcton signals due to widely shifted pulses.

In one preferred embodiment of a reference clock generating circuit in accordance with the invention, a sawtooth generator of conventional design is used. The generator includes a capacitor coupled to be charged by an incoming current to a first voltage level and to discharge to a second voltage level to provide the sawfooth waveform. The slope of each cyclic variation of the waveform and thus the duration thereof is determined by the rate of charging of the capacitor, the charging rate in turn being determined by the value of the applied current. A first gating device which may comprise a transistor responds to the presence of a gating pulse at the output of a binary trigger to pass a first current of selected value to the capacitor. A second gating device which may comprise a transistor and coupled inverter responds to the absence of a gating pulse to pass a second current of value different from the selected value of the first current to the capacitor. The two currents of different value charge the capacitor at different rates to provide successive pairs of cyclic variations of the sawtooth waveform with unequal period intervals of selected value. The two currents may be generated using a constant voltage and two impedances of different value. The voltage source is coupled to the capacitor through a first one of the impedances when the transistor of the first gating device conducts, and alternatively to the capacitor through the second impedance whenever the transistor of the second gating device conducts.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGS. 2A through 2N are waveforms useful in explaining the operation of the arrangement of FIG. 1;

FIGS. 6A through 6J are waveforms useful in explaining the operation of the arrangement of FIG. 5;

DETAILED DESCRIPTION

Figure 5:
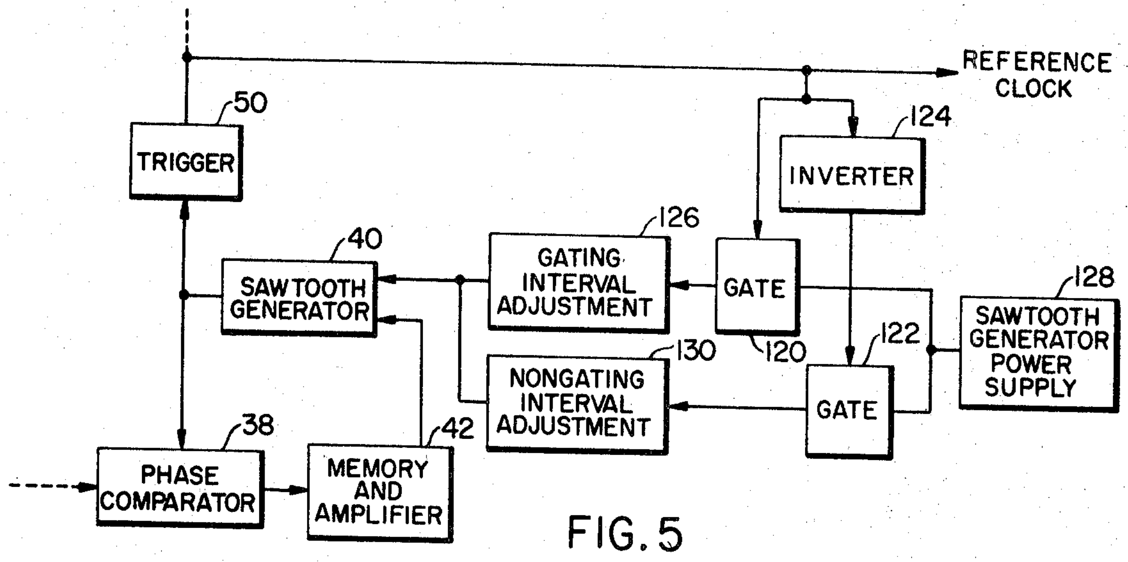
FIG. 5 is a block diagram of a portion of an arrangement for providing asymmetrical gating of data pulses in accordance with the invention.

The various features and advantages of the present invention may be better understood and appreciated by first considering two different prior art data detection systems. Accordingly, the problems posed by the conventional arrangement of FIG. 1 and the generally incomplete and unsatisfactory attempts made by the later conventional arrangement of FIG. 3 to solve such problems are considered before describing the present invention as shown in FIG. 5 and thereafter in detail.

Figure 1:
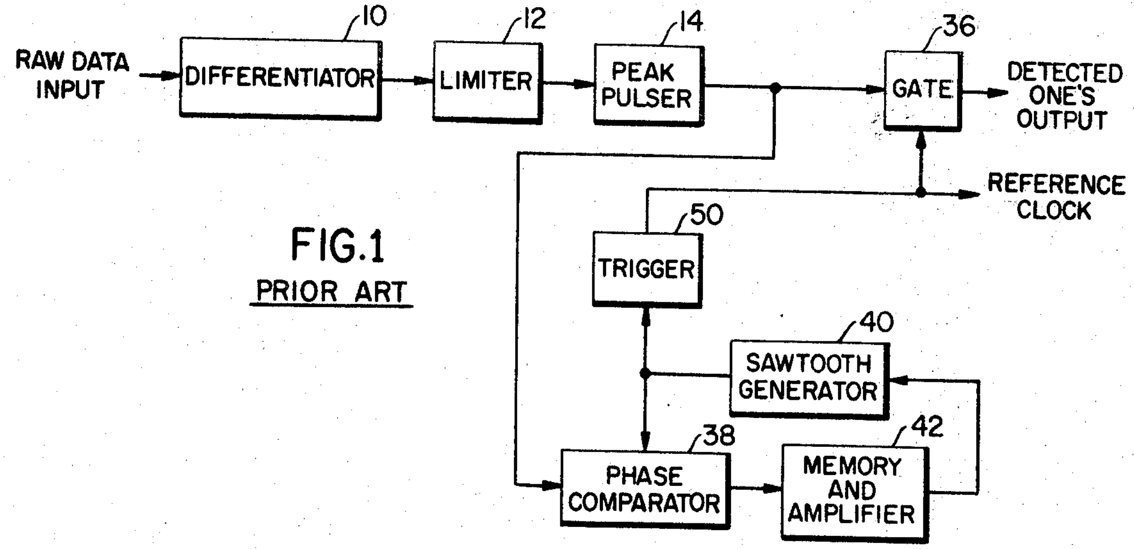
FIG.1 PRIOR ART
FIG. 1 is a block diagram of one prior art arrangement for detecting data by pulse gating.

FIG. 1 illustrates a common conventional arrangement for detecting encoded binary data by pulse gating. The raw data signal derived from a recording medium such as a magnetic tape, drum, disc, strip or the like, or from a communications channel or other appropriate source, is differentiated in a differentiator 10. The differentiated signal is then limited by a limiter 12 and the peaks thereof utilized to provide pulses via a peak pulser 14.

One example of a data signal which may be presented for detection by the FIG. 1 arrangement is illustrated in FIG. 2A. The data signal of FIG. 2A employs modified frequency encoding as described in the copending application, Ser. No. 653,784 previously referred to. In modified frequency encoding, "ones" are represented by transitions at the centers of the bit cells while "zeros" are represented by transitions at the leading edges of the bit cells unless the immediately preceding cell contains a "one." Accordingly, the bit cell intervals 16, 18, 22, 30 and 32 which represent "ones" have transitions at the centers thereof. The "zero" bit cell intervals 26 and 28 have transitions at the leading edges thereof. The "zero" bit cell intervals 20, 24 and 34 do not have transitions at the leading edges thereof since each is preceded by a bit cell interval in which a "one" is written. The data signal of FIG. 2A is shown in idealized fashion and is assumed to provide the peak pulses shown in FIG. 2B without any bit shift. The pulses are applied to a data gate 36 and to a phase camparator 38 wherein they are compared with a reference clock of sawtooth waveform from a sawtooth generator 40. The sawtooth waveform which is illustrated in FIG. 2C is phase and frequency controlled by the phase comparator 38 and a memory and amplifier 42. If the frequency of the sawtooth waveform is twice that of the data and if the sawtooth waveform has a zero-crossing upon the occurrence of each pulse from the peak pulser 14, no correction is made. If one or more of the pulses occur before or after the zero-crossings of the sawtooth waveform, however, the polarity and amplitude of the sawtooth waveform at the time of occurrence of each pulse are sampled by the phase comparator 38 to generate correction signals of corresponding sense and value. The correction signals are stored in and processed by the memory and amplifier 42 to effect correction of the sawtooth waveform as necessary. The data signal is normally preceded by a burst of "zeros" or "ones" to effect initial synchronization of the sawtooth generator 40 prior to detection. Examples of detailed circuitry which may be used to perform initial and subsequent phase locking of the sawtooth waveform are provided by U.S. Pat. 3,339,157; 3,192,477 and 3,349,389.

As shown in FIG. 2C, the sawtooth waveform comprises successive pairs of cyclic variations 44 and 46 having equal period intervals. Each pair of variations 44 and 46 has a total time duration 48 approximately equal to each of the bit time intervals 16, 18, etc., of the data signal. The phase of the sawtooth waveform is maintained so that the zero-crossing of the positive-going excursion of each of the first cyclic variations 44 coincides with the leading edge of a bit cell while the zero-crossing of the positive-going excursion of each of the second cyclic variations 46 coincides with the center of a bit cell. The cyclic variations 44 and 46 being of equal period interval, the negative-going excursion or flyback portion of each of the first cyclic variations 44 occurs at a point one-quarter of the time distance through a bit cell while the flyback portion of each of the second cyclic variations 46 occurs at a point three-quarters of the time distance through a bit cell.

A binary trigger 50 has a bilevel output which rises to a first level in response to the flyback portion of each cyclic variation 44 and which drops to a second level in response to the flyback portion of each cyclic variation 46 in the sawtooth waveform to provide a sequence of gating pulses to the data gate 36. The gating pulses 52 which are shown in FIG. 2D comprise a reference clock which may be used by logic circuitry such as shift registers at the output of the FIG. 1 arrangement to further process the detected data. It will be noted that each gating pulse 52 has a duration or width approximately equal to that of the nongating intervals adjacent thereto. The gate 36 is responsive to the gating pulses 52 to pass pulses from the peak pulser 14 to the circuit output whenever a gating pulse is present and to block the data pulses when a gating pulse is not present. The data gate 36 is accordingly opened at a point approximately one-quarter of the way through each bit time interval and is closed at a point approximately three-quarters of the way through the interval. Those peak pulses shown in FIG. 2B which are data pulses 54 are gated to the circuit output as detected "ones" as shown in FIG. 2E while the "zero" or clock pulses 56 are blocked.

The gate/nongate ratio of 50/50 as provided by the sawtooth waveform of FIG. 2C and the reference clock of FIG. 2D allows the data pulses 54 to be detected even though they are displaced up to 25% of the bit time interval in either direction from their desired time position. Similarly, the clock pulses 56 may be shifted up to 25% of the bit time interval without being erroneously detected as a "one." As will be seen from the discussion to follow, however, problems frequently arise leading to the erroneous detection of data when some of the data or clock pulses are shifted more than 25% of the bit time interval.

FIG. 2F illustrates a data signal which corresponds to the signal of FIG. 2A but which has been peak shifted. The transition 58 is assumed to lie in its ideal location. Transition 60 shifts away from transition 58 because of the close packing between those pulses and the wide spacing between 60 and 62. Transitions 64 and 66 and 68 and 70 are shifted away from one another by smaller amounts due to the existence of the smallest possible time interval equal to the bit interval between time intervals equal to one and one-half the bit interval. The corresponding peak pulses which result from the data signal of FIG. 2F are shown in FIG. 2G. The data pulse 54 occurring within the first bit interval 16 is gated to the output by the data gate 36 under the control of the reference clock from the binary trigger 50. The data pulses 54 occurring within the subsequent bit intervals 22, 30 and 32 are similarly gated to the output since they have been shifted less than 25% of the bit interval and are still within the "window" provided by the reference clock. The data pulse 54 occurring within the second bit interval 18, however, is not gated to the output since it has been shifted more than 25% of the bit interval.

Widely shifted pulses such as the data pulse 54 in the bit interval 18 may lead to further error in the form of a loss of synchronization of the sawtooth waveform. The correctly located pulse 54 within the bit interval 18 shown in FIG. 2E coincides with the zero-crossing of the cyclic sawtooth variation 46, and no correction signal is generated. As the pulse 54 is shifted to the right, an ever increasing positive voltage of the sawtooth waveform is sensed and correction signals are generated to decrease the sawtooth frequency. Up to this point, the data pulse 54 is still recognized by the phase comparator 38 as a shifted data pulse. If the pulse 54 is shifted to the right of the flyback portion of the cyclic variation 46 as in the case of the pulse 54 within the bit interval 18 of FIG. 2G, however, the pulse 54 is now mistakenly sensed by the phase comparator 38 as an early clock pulse 56 rather than a late data pulse 54. The positive-going excursion of the cyclic variation 44 which follows the variation 46 will thereby be used to generate a correction signal which will increase rather than decrease the sawtooth frequency, often resulting in a complete loss of synchronization.

A further synchronization problem lies in the fact that the "one" transitions of the FIG. 2F data signal typically experience a greater shift than the clock transitions. The slopes of the positive-going excursions of adjacent cyclic variations 44 and 46 of the sawtooth waveform being equal, the "one" transitions provide correction signals of larger value than do the clock transitions. The "one" correction signals therefore overcompensate while the clock correction signals undercompensate. Under such conditions, the phase of the sawtooth waveform is apt to fluctuate more than necessary with respect to the data intervals.

It will be seen that in certain types of encoding, such as of the modified frequency type, the greatest peak shift occurs at the data or "one" transitions while the "zero" or clock transitions undergo relatively little shift. For encoding of this type, it is therefore desirable that the gating intervals be widened relative to the nongating interval. For other types of encoding such as of the double frequency type, however, the greatest peak shift occurs at the clock transitions, and in such situations, the gating window provided by the reference clock is desirably narrowed relative to the degating interval.

FIG. 2I illustrates a double frequency encoded data signal as it may be presented in ideal form to represent the particular data shown in FIG. 2A. A clock transition appears at the leading edge of each bit cell, and in addition, a data transition appears at the center of each bit cell representing a "one." Data and clock pulses 54 and 56 are provided by the peak pulser 14 as shown in FIG. 2J to effect the generation of the sawtooth waveform of FIG. 2C and the reference clock of FIG. 2D. The data pulses 54 are accordingly gated by the data gate 36 as "ones" while the clock pulses 56 are blocked as shown in FIG. 2K.

FIG. 2L illustrates the double frequency encoded data signal of FIG. 2I as it may occur in actual practice due to peak shift. The clock transitions 72 and 74 are shifted toward one another by a small amount because of the intervening time interval which is twice the size of the adjacent time intervals. The clock transition 76 is shifted toward 78 because of the short preceding interval and the longer following interval. Pulse 82 is shifted toward 80 because of the short preceding interval and the longer following interval. The clock transition 84 is similarly shifted. The corresponding pulses from the peak pulser 14 are shown in FIG. 2M. Again, as in the case of the data signal of FIG. 2I, the data pulses 54 occurring within the bit cells 16, 18, 22, 30 and 32 are gated to the output as "ones." In addition, however, the clock pulses 56 within the bit cells 24 and 28 which have been shifted more than 25% of the bit time interval are erroneously gated to the output as "ones."

It will therefore be seen that a gating interval of smaller duration than the nongating interval is generally desirable for detecting data encoded in double frequency or similar formats.

Synchronization problems similar to those discussed in connection with FIG. 2F exist in the detection of the data signal of FIG. 2L. In the present instance, however, the clock pulses rather than the data pulses pose the threat of a complete loss of synchronization. Also, the sawtooth generator may be poorly controlled because the clock transition generated correction signals are of larger value than the data transition generated correction signals in the present instance.

Figure 3:
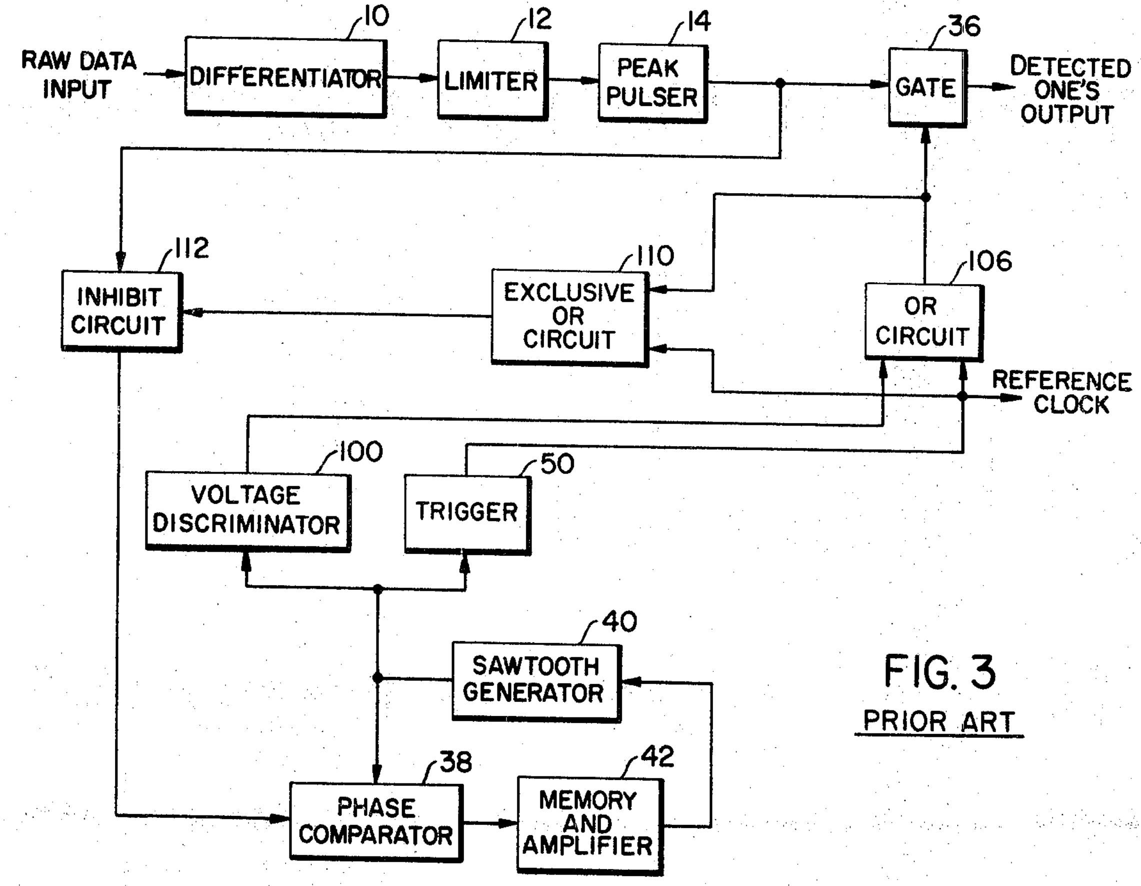
FIG. 3 PRIOR ART
FIG. 3 is a block diagram of a further prior art arrangement in which asymmetrical gating of data pulses is provided.
Figure 4:
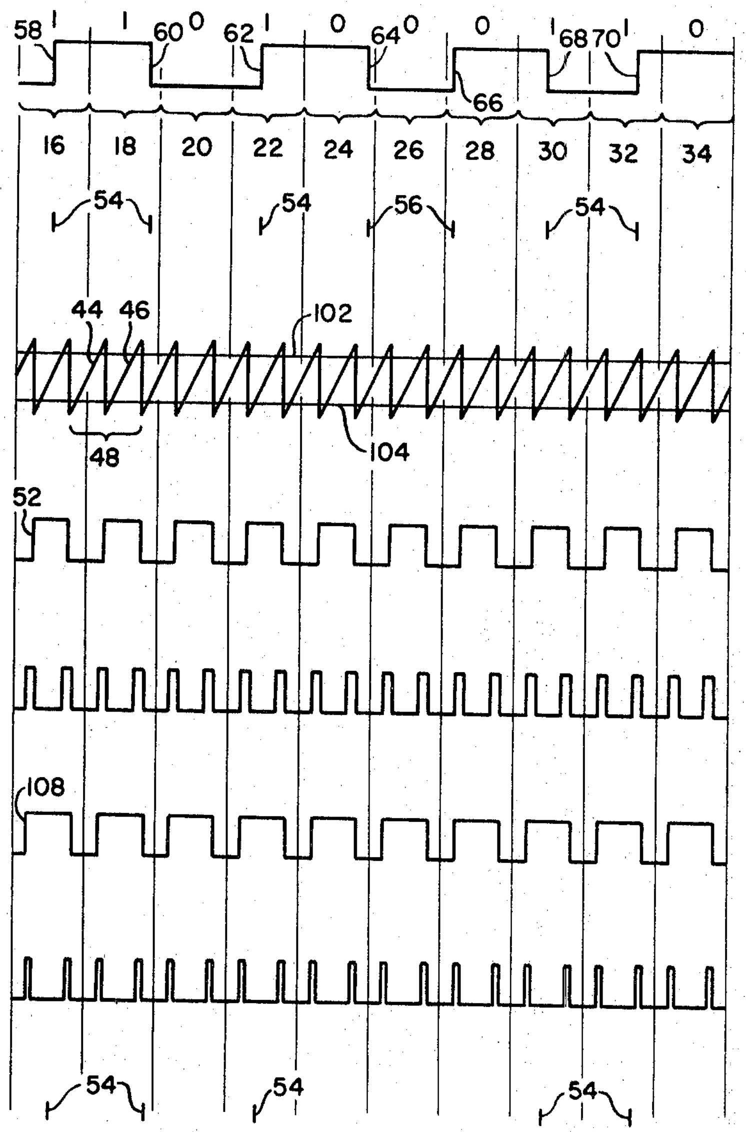
FIGS. 4A through 4H are waveforms useful in explaining the operation of the FIG. 3 arrangement.

One conventional arrangement which provides for gating intervals or pulses of greater duration than the nongating intervals is illustrated in FIG. 3 with corresponding waveforms being illustrated in FIGS. 4A through 4H. The peak pulser 14, sawtooth generator 40 and trigger 50 of the FIG. 3 arrangement function in the same manner as in the FIG. 1 arrangement to provide the peak pulses, sawtooth waveform and reference clock shown in FIGS. 4B, 4C and 4D. These waveforms are therefore virtually identical to those shown in FIGS. 2G, 2C and 2D. The difference is that the gating pulses 52 of the reference clock are no longer used exclusively to control the data gate 36. Instead, a voltage discriminator 100 which is responsive to the sawtooth waveform generates a series of pulses shown in FIG. 4E using threshold detection of the sawtooth waveform. Such thresholds are illustrated in FIG. 4C as 102 and 104. Each time a positive-going excursion of the cyclic variation 44 or 46 crosses the positive threshold 102, the voltage discriminator 100 responds by initiating the generation of one of the pulses shown in FIG. 4E. The generation of such pulse continues as the sawtooth waveform undergoes the negative-going excursion or flyback, and continues until the subsequent positive-going excursion increases above the negative threshold 104, at which point the pulse is terminated. The pulses from the voltage discriminator 100 and the reference clock from the trigger 50 are applied to an OR circuit 106, the output of which is illustrated in FIG. 4F. The OR circuit 106 effectively adds the discriminator pulses to the reference clock to provide a new sequence of gating pulses 108 of greater width. The data gate 36 gates the data pulses 54 occurring in the bit cell intervals 16, 22, 30 and 32 to the output under the control of the gating pulses 108 in a manner similar to that of FIG. 1 as shown in FIG. 4H. In addition, the data pulse 54 occurring within the interval 18 is also gated to the output even though it is shifted greater than 25% of the bit interval, due to the increased width of the gating pulses 108.

While arrangements such as that shown in FIG. 3 provide asymmetrical gate/nongate ratios in which the gating pulse or interval is larger than the nongating interval, such arrangements suffer from a number of serious limitations. Threshold detection such as is provided by the voltage discriminator 100 is generally unreliable. Even where relatively complex and expensive circuitry is used, the thresholds have a tendency to drift providing unreliable and in some instances erroneous data detection. A similar occurrence will take place if the peak amplitudes of the sawtooth waveform decrease by a sufficient amount. The duration of the gating pulses 108 becomes increasingly variable or unreliable as the threshold limits 102 and 104 are raised to provide gate/nongate ratios approaching 50/50. Thus, while a ratio of 65/35 may encounter gating pulse width problems which are not quite so severe, a ratio of 55/45 or 53/47 may prove to be completely unreliable because of the relative closeness of the threshold limits 102 and 104 to the sawtooth peaks. A ratio of 50/50 moreover may be unattainable because of sawtooth waveform flyback portions which are normally of finite duration.

Arrangements such as that shown in FIG. 3, while generally unreliable, may operate with reasonable success in certain applications. Such arrangements, however, use a symmetrical reference clock as in the FIG. 1 arrangement, and accordingly, the problems of loss of synchronization and unequal correction of the sawtooth waveform still exist. The loss of synchronization problem can be partially solved, but only by the addition of inhibit circuitry. The reference clock from the trigger 50 and the gating pulses from the OR circuit 106 are applied to an exclusive OR circuit 110, the output of which is illustrated in FIG. 4G. These pulses are fed to an inhibit circuit 112 to block those data pulses which are shifted by more than 25% of the bit interval from the phase comparator 38. Loss of synchronization is thereby prevented, but only at the expense of increased circuitry and a loss of certain synchronizing pulses. The problem of unequal correction of the sawtooth frequency is in any event not solved.

The various problems of the prior art are eliminated in accordance with the invention by an arrangement in which the sawtooth waveform itself is provided with unequal period intervals to effect asymmetrical gating as desired and to accommodate asymmetrical peak shift for proper clock synchronization. Such an arrangement is shown in FIG. 5 wherein the peak shifted modified frequency encoded data signal of FIG. 6A provides the peak pulses shown in FIG. 6B in the same manner as in the arrangements of FIGS. 1 and 3. Accordingly, the differentiator 10, limiter 12, peak pulser 14 and data gate 36 have been eliminated from FIG. 5 for simplicity. The phase comparator 38, memory and amplifier 42 and sawtooth generator 40 respond to the incoming data and clock pulses 54 and 56 to provide a sawtooth waveform of selected phase and frequency to the trigger 50. The output of the binary trigger 50 is applied to a first gate 120 and is applied to a second gate 122 through an inverter 124 as well as to the data gate 36. The first gate 120 and a gating interval adjustment 126 are coupled between a power supply 128 and the sawtooth generator 40. The second gate 122 and a nongating interval adjustment 130 are also coupled between the power supply 128 and the sawtooth generator 40. The gating interval adjustment 126 functions in combination with the power supply 128 and the opening of the first gate 120 to provide a first current of selected value to the sawtooth generator 40. The nongating interval adjustment 130 functions in combination with the power supply 128 and in response to the opening of the second gate 122 to provide a second current of value different from the selected value of the first current to the sawtooth generator 40. When a gating pulse is present at the output of the trigger 50, the first gate 120 is opened to provide the first current to the sawtooth generator 40. In the absence of a gating pulse from the trigger 50, the second gate 122 is opened via the inverter 124 to pass the second current to the sawtooth generator 40.

Figure 7:
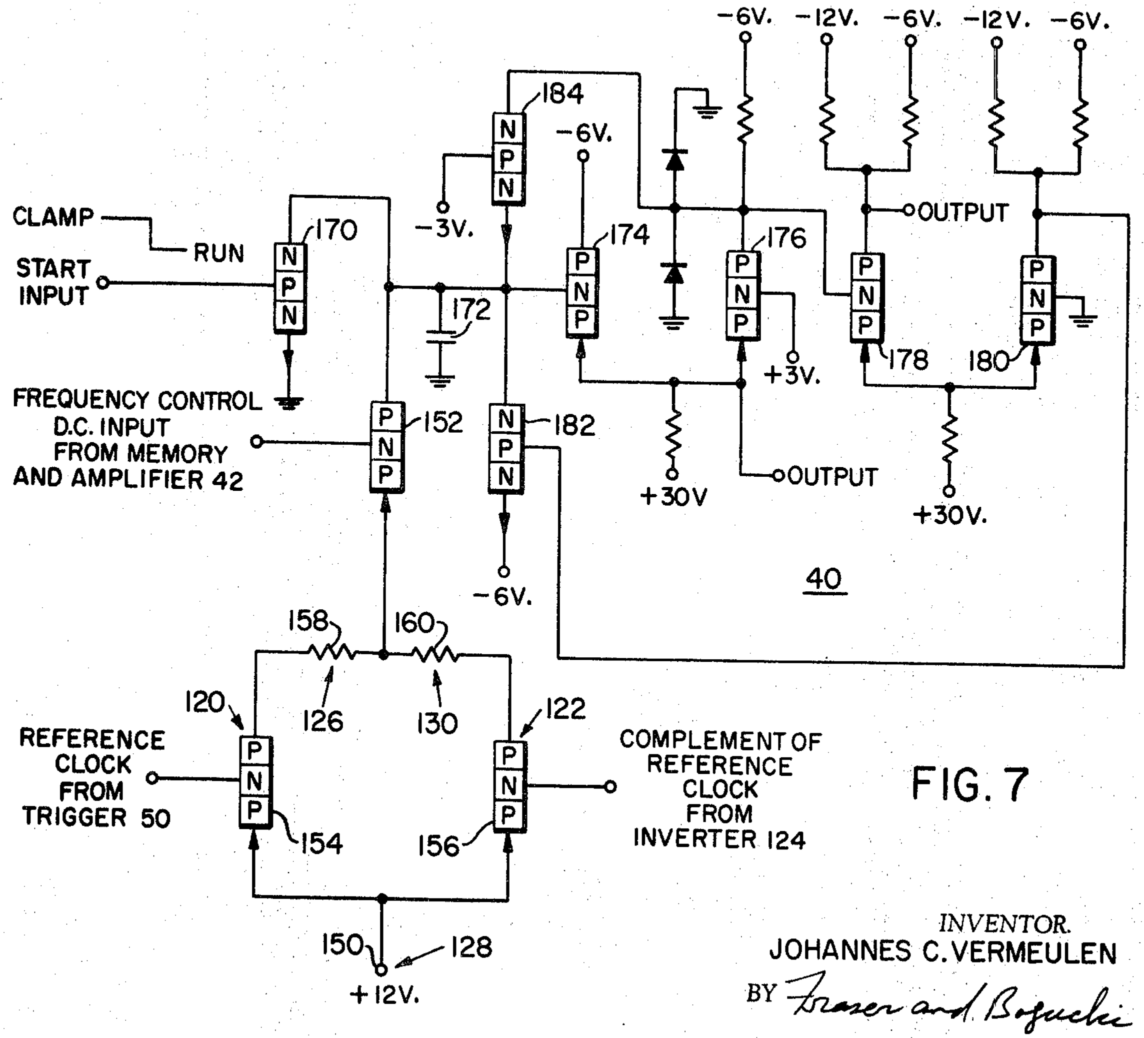
FIG. 7 is a schematic diagram of one preferred embodiment of a portion of the FIG. 5 arrangement.

As will become more fully apparent from the discussion of FIG. 7, the two different currents from the adjustments 126 and 130 charge a capacitor within the sawtooth generator 40 at different rates to provide each pair of cyclic variations 44 and 46 with different period intervals. The total time duration 48, however, remains equal to the bit intervals. The comparator 38 and memory and amplifier 42 additionally maintain a selected phase relationship between the sawtooth waveform and the data signal in the manner previously described.

One possible sawtooth waveform which may be provided by the arrangement of FIG. 5 is illustrated in FIG. 6C. In this instance, the first cyclic variation 44 of each pair is of relatively short duration compared to the second cyclic variation 46. The resulting reference clock from the trigger 50 comprises a sequence of gating pulses 132 which have a width substantially greater than the nongating intervals 134. Widely shifted data pulses such as the pulse 54 within the bit interval 18 are included within the broadened gating pulses 132 and are gated to the output as a "one." The sawtooth waveform of FIG. 6C is provided by a first current from the gating interval adjustment 126 of substantially smaller value than the second current from the nongating interval adjustment 130. Upon termination of each gating pulse 132, the second gate 122 is opened to pass the second current of larger value to the sawtooth generator 40. The capacitor within the generator 40 is charged at a relatively rapid rate providing the first cyclic variation 44 as illustrated in FIG. 6C. Upon discharge of the capacitor and simultaneous initiation of a new gating pulse 132, the first gate 120 is opened to pass the current of smaller value to the capacitor within the sawtooth generator 40. The capacitor accordingly charges at a relatively slow rate providing the second cyclic variation 46 as illustrated in FIG. 6C.

Gating pulses of relatively narrow width may also be provided by the arrangement of FIG. 5 if the first current from the gating interval adjustment 126 is made larger than the second current from the nongating interval adjustment 130. The resulting sawtooth waveform which is illustrated in FIG. 6H is useful in detecting data in which the clock transitions experience the greatest peak shift. The current of relatively small value from the nongating interval adjustment 130 flows in the absence of a gating pulse to provide the first cyclic variation 44 with a relatively small slope as shown in FIG. 6H. Similarly, the relatively large current which flows from the gating interval adjustment 126 in the presence of a gating pulse provides the second cyclic variation 46 of the sawtooth waveform with a relatively large slope as shown. The corresponding reference clock from the trigger 50 comprises a sequence of gating pulses 136 of width considerably less than the intervening nongating intervals 138.

A peak shifted double frequency encoded data signal and the corresponding peak pulses therefrom are shown in FIGS. 6F and 6G, respectively. The data pulses 54 are gated under the control of the gating pulses 136 as before. Unlike the arrangement of FIG. 1, however, the clock pulses 56 occurring within the bit intervals 24 and 28 are not gated as "ones" as shown in FIG. 6J because of the narrowed gating pulses 136.

A preferred embodiment of the arrangement of FIG. 5 is schematically illustrated in FIG. 7. The sawtooth generator power supply 128 in this instance comprises a source of constant voltage having a terminal 150 at which the constant voltage is maintained. The terminal 150 is coupled to the emitter of a PNP transistor 152 through two different paths, one of which includes the first gate 120 and gating interval adjustment 126 and the second of which includes the second gate 122 and the nongating interval adjustment 130. The gates 120 and 122 comprise PNP transistors 154 and 156 while the gating and nongating interval adjustments 126 and 130 comprise impedances 158 and 160.

The transistor 152 and the remainder of the circuitry shown in FIG. 7 comprise the sawtooth generator 40. The illustrated circuitry for the sawtooth generator is the same as that described in U.S. Pat. 3,156,875, and accordingly, such circuitry will be only briefly described. The collector of the transistor 152 is coupled to ground through a turn-on transistor 170 and through a capacitor 172. A first pair of switching transistors 174 and 176 is biased such that the left-hand transistor 174 is normally conducting. A second pair of switching transistors 178 and 180 is similarly biased such that the left-hand transistor 178 normally conducts. Current from the transistor 152 charges the capacitor 172 to a predetermined upper voltage level, in this instance +3 volts. When this voltage is reached, the current in the conducting transistor 174 is switched to the transistor 176 to bias the transistor 178 into nonconduction and turn on the transistor 180. The turn-on of the transistor 180 provides a positive shift in the voltage at the collector thereof and at the base of a transistor 182. The transistor 182 conducts and the charged capacitor 172 discharges therethrough until a lower voltage level is reached, in this instance −3 volts. When that voltage is reached, a transistor 184 conduts to turn on the transistor 178. The transistors 180 and 182 are thereby cut off and discharge of the capacitor 172 terminates. The capacitor 172 again commences charging at a rate determined by the magnitude of the current flowing from the transistor 152 until +3 volts is reached, whereupon the capacitor discharges to −3 volts in the manner described above. The phase of the generated sawtooth waveform is initially adjusted by a start signal applied to the base of the transistor 170.

As pointed out in U.S. Pat. 3,156,875, the frequency of the sawtooth generator is determined by the magnitude of the current flowing through the transistor 152 to charge the capacitor 172. The total current is controlled by the memory and amplifier 42 which adjusts the base bias of the transistor 152 to establish a desired level of conduction therein. In accordance with the invention, the total charge applied to capacitor 172 for each pair of the cyclic variations 44 and 46 is maintained constant to provide the sawtooth waveform with an overall frequency twice that of the data. The period intervals of adjacent cyclic variations 44 and 46, however, are made unequal by applying a first current of given magnitude to generate the one cyclic variation and a second current of selected magnitude different from the first current to generate the other one of each pair.

When a gating pulse is present at the output of the binary trigger 50, the gating transistor 154 is biased into conduction and the first current the magnitude of which is determined by the impedance 158 flows from the terminal 150 through the transistor 154, the impedance 158 and the transistor 152 to charge the capacitor 172. Upon termination of the gating pulse, the transistor 154 is turned off and the gating transistor 156 is simultaneously turned on. The second current the magnitude of which is determined by the impedance 160 flows from the terminal 150 through the transistor 156, the impedance 160 and the transistor 152 to charge the capacitor 172. If the impedance 158 is relatively large in value compared to the impedance 160, the first current through the impedance 158 is small in value and the capacitor 172 is charged relatively slowly. The second current from the impedance 160 has a relatively large value, and the capacitor 172 is charged at a relatively rapid rate. This set of conditions will provide a sawtooth waveform such as that shown in FIG. 6C. The resulting gating intervals will therefore be larger than the intervening nongating intervals. If a sawtooth waveform such as that shown in FIG. 6H is desired in order to provide a gating interval which is smaller than the intervening nongating intervals, the impedance 158 is made small relative to the impedance 160. In the presence of a gating pulse from the binary trigger 50, the resulting first current of relatively large value as gated by the transistor 154 charges the capacitor 172 at a relatively rapid rate. Similarly, in the absence of a gating pulse, the second current of relatively small value as provided by the transistor 156 charges the capacitor 172 at a much lower rate.

The impedances 158 and 160 shown in FIG. 7 provide a fixed gate/nongate ratio in accordance with their relative values. If an adjustable ratio is desired such as where the detection system is to be used to detect data having different types of encoding, the impedances 158 and 160 may be replaced by a single resistor with wiper arm coupled to the emitter of the transistor 152. The positioning of the wiper arm along the length of the resistor determines the gate/nongate ratio in such an arrangement.

The operation of the sawtooth generator 40 under the control of the gates 120 and 122 and the interval adjustments 126 and 130 as shown in FIG. 7 may be further analyzed in terms of the rate of relationship of the adjacent period intervals to the total time duration of each pair thereof. If E is the potential difference between the emitter of transistor 152 and the terminal 150, $\Delta V$ is the voltage swing of the sawtooth waveform, $\Delta t_1$ and $\Delta t_2$ are the respective time durations of the first and second cyclic variations, $R_1$ and $R_2$ are the respective resistances of the impedances 158 and 160, C is the capacitance value of 172, and $V_{ce}$ of both transistors 154 and 156 is ignored, then:

$$\Delta t_1 = \frac{C\Delta V}{E} R_1 \quad (1)$$

$$\Delta t_2 = \frac{C\Delta V}{E} R_2 \quad (2)$$

$$\Delta t_1 + \Delta t_2 = \frac{C\Delta V}{E}(R_1 + R_2) \quad (3)$$

$$\frac{\Delta t_1}{\Delta t_2} = \frac{R_1}{R_2} \quad (4)$$

As previously pointed out, the generation of unequal adjacent period intervals of the sawtooth waveform in accordance with the invention does not affect the overall frequency of the sawtooth waveform since the total charge of the capacitor 172 during each adjacent pair of period intervals is kept constant. This is illustrated by Equation 3 in which $\Delta t_1 + \Delta t_2$ is shown to depend on the sum of $R_1$ and $R_2$. Thus, even though $R_1$ and $R_2$ are of widely differing values, the total time duration of each pair of cyclic variations will be unaffected so long as the sum of the two resistances is equal to a desired value. Equation 4 shows that the ratio of adjacent period intervals $\Delta t_1$ and $\Delta t_2$ is equal to the ratio of the resistances $R_1$ and $R_2$.

It should be understood that the particular arrangements of FIGS. 5 and 7 are presented by way of example only, and that other appropriate arrangements for generating a reference clock having unequal adjacent period intervals may be used in accordance with the invention. Thus, instead of charging a single capacitor using two currents of different value as previously described, an arrangement could be used wherein a single current of constant value is employed to alternately charge two capacitors of different value in multivibrator fashion.

Figure 8A:
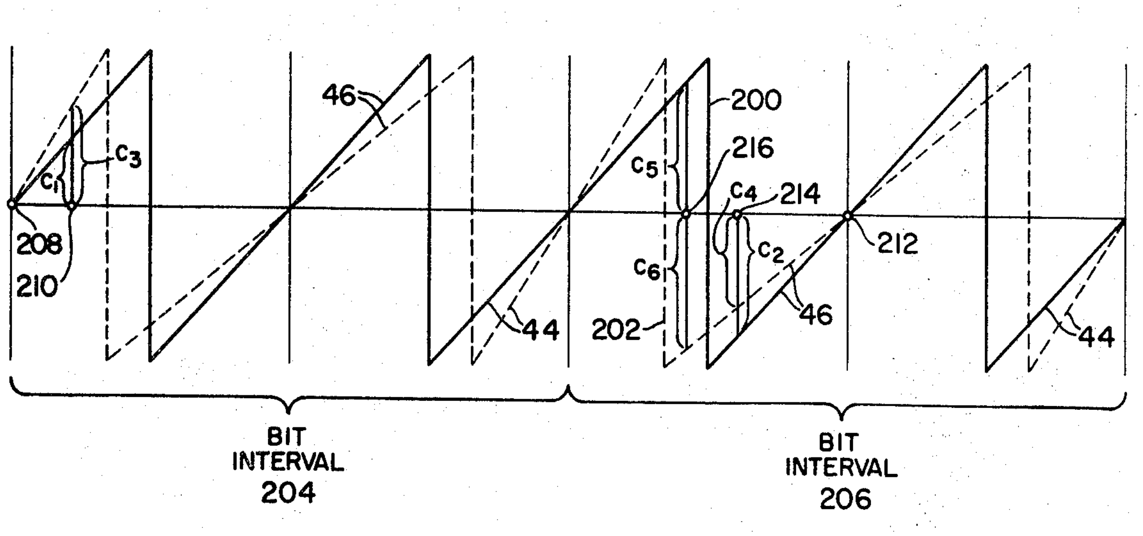
FIGS. 8A and 8B are waveforms useful in explaining the advantages of detection systems in accordance with the invention.

In systems according to the invention, the possibility of loss of synchronization of the sawtooth waveform due to widely shifted data or clock pulses is greatly minimized. The possibility of undesirable correction signals of very large magnitude due to widely shifted pulses is also greatly minimized. Referring to FIG. 8A, a sawtooth waveform 200 of conventional shape as in the case of FIGS. 2C and 4C is shown in solid outline. A sawtooth waveform 202 in accordance with the invention having shortened cyclic variations 44 and lengthened cyclic variations 46 as in FIG. 6C is shown in dotted outline. If the two bit intervals 204 and 206 shown are assumed to correspond to the intervals 28 and 30 in FIG. 6A, then the clock pulse 56 which should ideally occur at the zero-crossing point 208 instead occurs at a point 210 which is shifted to the right. Similarly, the data pulse 54 within the interval 206 which should ideally occur at the zero-crossing point 212 instead occurs at the point 214 which is shifted by a substantial amount to the left. If the sawtooth waveform 200 is used as the reference clock, the phase comparator 38 will respond to the shifted clock pulse at the point 210 to generate a positive correction signal of value $C_1$ and to the shifted data pulse at the point 214 to generate a negative correction signal of value $C_2$. $C_2$ is considerably larger than $C_1$ and will tend to increase the sawtooth frequency by a substantial amount. The resulting succession of correction signals of different value tends to provide unduly excessive correcting of the sawtooth frequency such that optimum stabilization is difficult to achieve. Using the sawtooth waveform 202, however, a correction signal of value $C_3$ is generated at the point 210 and a correction signal of value $C_4$ is generated at the point 214. $C_3$ is similar in value to $C_4$, and if the points 210 and 214 are assumed to represent typical peak shifts for the respective data and clock pulses, then variable or unequal adjustment of the sawtooth frequency is greatly minimized.

If the data pulse within the bit interval 206 is shifted to the left by more than 25% of the bit interval so as to be at a point 216, use of the sawtooth waveform 200 will provide a positive correction signal of value $C_5$. This positive signal tends to further reduce the sawtooth frequency rather than increasing it. The sawtooth waveform 200 may completely lose synchronization as a result. If the waveform 202 is used, however, the point 216 occurs within the interval of the cyclic variation 46, and a negative correction signal of value $C_6$ is provided to increase the sawtooth frequency as desired.

Figure 8B:
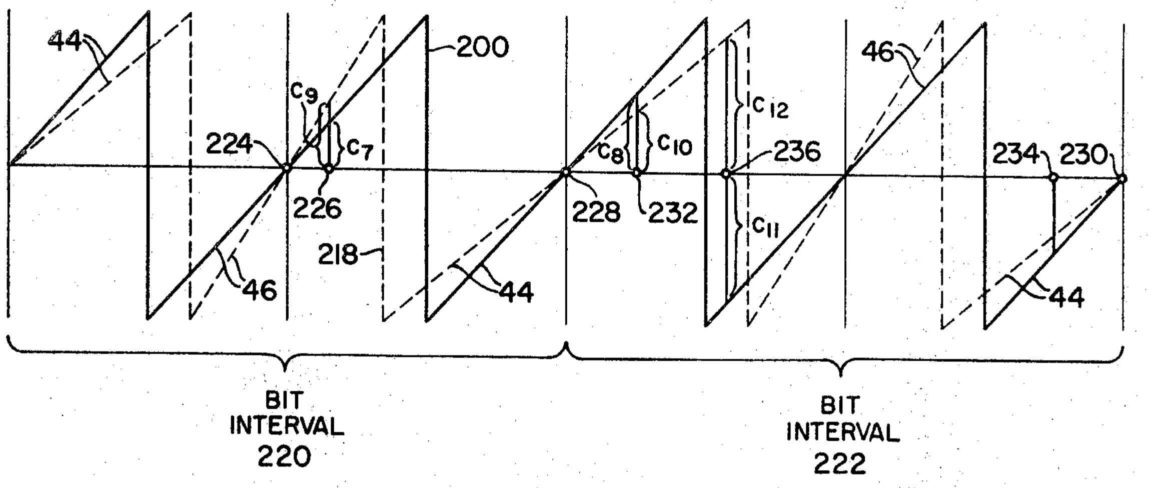

FIG. 8B depicts the case in which data having greater shift of the clock transitions than the data transitions is to be detected. A sawtooth waveform 218 having larger cyclic variations 44 than the intervening variations 46 is shown in dotted outline. If the bit intervals 220 and 222 are assumed to correspond to the intervals 18 and 20 of the FIG. 6F data signal, then the data pulse 54 within the interval 220 and which is ideally located at the zero-crossing point 224 is assumed to lie at a point 226 to the right thereof. Similarly, the clock pulses 56 within the interval 222 which should lie at the points 228 and 230 are shifted toward one another so as to lie at the points 232 and 234. The clock pulses are shifted a greater amount than the data pulse and the resulting values $C_7$ and $C_8$ of correction signals generated using the waveform 200 differ substantially. Using the waveform 218 in accordance with the invention, however, the resulting correction signal values $C_9$ and $C_{10}$ are substantially equal. Should the clock pulse at the point 228 be shifted by more than 25% of the bit interval so as to lie at a point 236, the sawtooth waveform 200 will result in a negative correction signal of value $C_{11}$ to further decrease the sawtooth frequency and possibly cause loss of synchronization. The waveform 218 on the other hand provides a positive correction signal of value $C_{12}$ to increase the sawtooth frequency.

While reference clock generators in accordance with the invention are most useful in detection systems employing pulse gating, it will be appreciated by those skilled in the art that such generators may also be used to advantage in arrangements employing other types of detection such as by integration because of the greater error correction ability and the resulting accuracy of such reference clock.

While the invention has been particularly shown and described with reference to a preferred embodiment thereof, it will be understood by those skilled in the art that various changes in form and detail may be made therein without departing from the spirit and scope of the invention.

What is claimed is:

1. A system for gating an information signal to an output during selected portions of a succession of bit intervals thereof comprising:

means responsive to the information signal for generating an alternating reference signal having successive pairs of cyclic variations in synchronism with the information signal, the time duration of each pair of cyclic variations being substantially equal to the time duration of a bit interval of the information signal, and the time durations of the cyclic variations comprising each pair being different;

means responsive to the alternating reference signal for generating a bilevel gating signal, said gating signal assuming a first level in response to the first cyclic variation of each pair and assuming a second level in response to second the cyclic variation of each pair; and means responsive to the bilevel gating signal for gating the information signal to the output whenever the bilevel gating signal assumes the first level.

2. A system in accordance with claim 1, wherein the alternating reference signal is of generally sawtooth waveform, each cyclic variation thereof comprising a positive-going excursion followed by a negative-going excursion of substantially vertical slope, the slopes of the positive-going excursions of adjacent cyclic variations being different from one another, and wherein the gating signal generating means responds to the negative-going excursion of each cyclic variation.

3. A system in accordance with claim 2, wherein the means for generating a reference signal includes a sawtooth generator having a capacitor, the charging and discharging of which respectively provide the positive-going and negative-going excursions of the sawtooth waveform and the rate of charging of which determines the slope of the positive-going excursions of the sawtooth waveform, and means responsive to the gating signal for coupling a first current of selected value to charge the capacitor whenever the gating signal assumes said first level and for coupling a second current of selected value different from the value of the first current to charge the capacitor whenever the gating signal assumes said second level.

4. In a system for detecting binary data carried within a succession of bit cell intervals of an input signal, a circuit for generating a reference signal in synchronism with the input signal comprising:

means responsive to the input signal for generating a reference signal having an overall frequency which is substantially twice the rate of occurrence of the binary data in the input signal and alternate period intervals which are of different duration than the intervening period intervals; and means responsive to the input signal and to the alternating reference signal for maintaining a selected phase relationship between the reference signal and the input signal such that the centers of alternate period intervals of the reference signal coincide with the edges of the bit cell intervals of the input signal and the centers of the intervening period intervals of the reference signal coincide with the centers of the bit cell intervals of the input signal.

5. A circuit in accordance with claim 4, wherein the input signal comprises a series of pulses, each period interval of the reference signal includes a positive-going excursion and a negative-going excursion of a sawtooth waveform, and the means for maintaining a selected phase relationship between the reference signal and the input signal includes means for varying the frequency of the reference signal in accordance with the time displacement of selected ones of the series of pulses relative to the zero-crossings of the positive-going excursions within selected ones of the period intervals.

6. A system for detecting binary data represented by the presence or absence of data pulses within successive bit time intervals comprising:

means for generating a reference signal having successive pairs of asymmetrical cyclic variations;

means responsive to the reference signal and to the data pulses for maintaining the time duration of the successive pairs of cyclic variations substantially equal to the bit time intervals;

output means;

means responsive to the asymmetrical cyclic variations of the reference signal for generating a sequence of processing pulses, each processing pulse being initiated upon the occurrence of a selected portion of a first one of the cyclic variations of a particular pair and being terminated upon the occurrence of a selected portion of a second one of the cyclic variations within the pair; and means responsive to the processing pulses to couple the data pulses to the output means whenever a processing pulse is present.

7. A system in accordance with claim 6, wherein the reference signal is of generally sawtooth waveform, and the selected portions of each pair of asymmetrical cyclic variations to which the processing pulse generating means is responsive comprise the flyback portions of the sawtooth waveform.

8. A system in accordance with claim 7, wherein the means for generating a reference signal comprises a sawtooth generator, the sawtooth waveform of which has a slope dependent upon the value of a current applied to the sawtooth generator, and means responsive to the processing pulses for applying a current of one value to the sawtooth generator when a processing pulse is present and for applying a current of value different from said one value to the sawtooth generator whenever a processing pulse is not present.

9. A system in accordance with claim 8, wherein the sawtooth generator includes a capacitor coupled to be charged by the applied current to one voltage level and to discharge to another voltage level, the rate of charging of the capacitor being dependent upon the value of the applied current and determining the slope of the sawtooth waveform, and wherein the means for applying a current to the sawtooth generator includes means for generating the currents of said one value and of said value different from said one value, first gating means responsive to the presence of a gating pulse to couple the current of said one value to charge the capacitor, and second gating means responsive to the absence of a gating pulse to couple the current of said value different from said one value to charge the capacitor.

10. A system in accordance with claim 9, wherein the current generating means comprises a constant voltage source, means including the first gating means and a first impedance of given value for coupling the voltage source to the capacitor, and means including the second gating means and a second impedance of value different from the given value of the first impedance for coupling the voltage source to the capacitor.

11. A system in accordance with claim 10, wherein the first gating means comprises a first transistor coupled to be biased into conduction by each gating pulse, and wherein the second gating means comprises a second transistor and inverter means responsive to the gating pulse to bias the second transistor into conduction whenever a gating pulse is not present.

References Cited

UNITED STATES PATENTS 3,156,875 11/1964 Fiorino et al. ------- 333—111

ROY LAKE, Primary Examiner

L. J. DAHL, Assistant Examiner

U.S. Cl. X.R.

328—185; 329—104